Aug. 5, 1941.  L. F. ATHY ET AL  2,251,817
METHOD OF BOREHOLE LOGGING
Filed April 18, 1938  7 Sheets-Sheet 1

INVENTORS
Lawrence F. Athy
Harold R. Prescott
BY
Thos. E. Scofield
ATTORNEY

INVENTORS
Lawrence F. Athy
Harold R. Prescott
BY
ATTORNEY

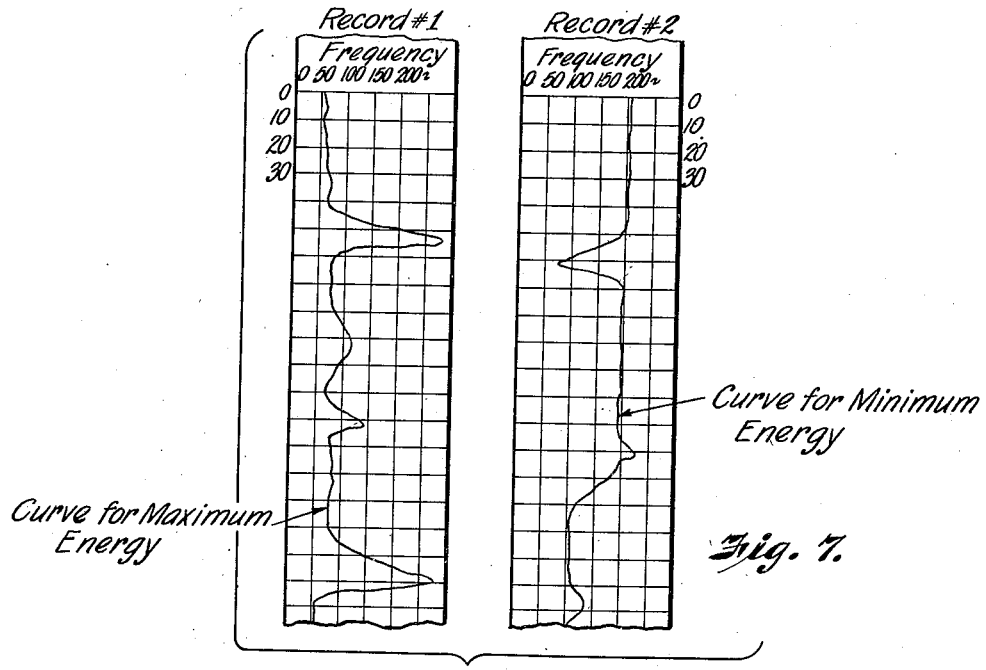
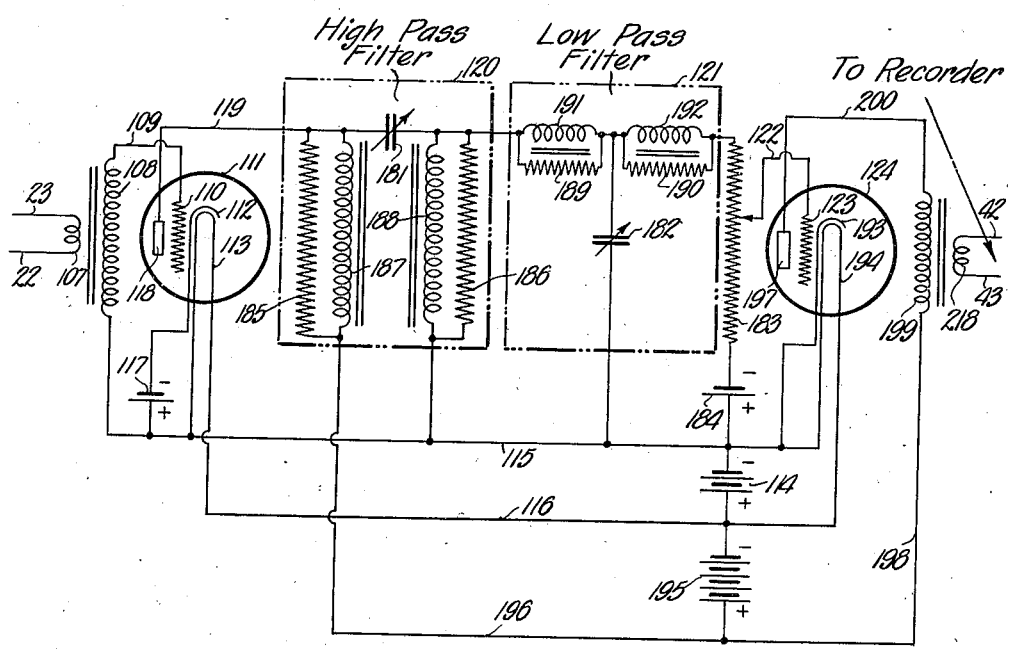

Aug. 5, 1941.    L. F. ATHY ET AL    2,251,817
METHOD OF BOREHOLE LOGGING
Filed April 18, 1938    7 Sheets-Sheet 5

INVENTORS
Lawrence F. Athy
Harold R. Prescott
BY
Thos. E. Scofield
ATTORNEY

Aug. 5, 1941.　　　　L. F. ATHY ET AL　　　　2,251,817
METHOD OF BOREHOLE LOGGING
Filed April 18, 1938　　　7 Sheets-Sheet 7

INVENTORS
Lawrence F. Athy
Harold R. Prescott
BY
ATTORNEY

Patented Aug. 5, 1941

2,251,817

UNITED STATES PATENT OFFICE 2,251,817

METHOD OF BOREHOLE LOGGING

Lawrence F. Athy and Harold R. Prescott, Ponca City, Okla., assignors to Continental Oil Company, Ponca City, Okla., a corporation of Delaware Application April 18, 1938, Serial No. 202,741

3 Claims. (Cl. 181—0.5)

Our invention relates to a method of bore hole logging.

More or less parallel beds of rock materials are pierced by bore holes drilled for exploratory purposes in seeking oil or gas. It is essential to prospectors to be able to recognize certain identifying characteristics of the beds penetrated in order that the geological structure of the buried formations may be accurately determined. This geological structure is a guide in seeking accumulations of oil, gas, or other valuable deposits. By recognizing and logging a sequence of identifying characteristics with respect to depth of parallel beds or sea level elevation in individual bore holes, it is possible to determine the relative structural attitude and position of the various rock formations contributing to these recognizable characteristics.

In geological explorations, core drilling has been resorted to in order to determine the characteristics of the beds penetrated. A record or log is kept showing the different formations traversed. This log is obtained by sampling the drill cuttings to determine their variation in mineral content or rock type. It is a common practice to sample the drill cuttings taken from bore holes and from a careful study of these cuttings to determine their variation of mineral content or rock type with depth or elevation and thereby provide a subsurface map of the structure of said buried formations. Commonly, holes are drilled to relatively shallow depths solely for purposes of determining the structure of the subsurface. In many areas it is impossible or difficult to correlate cuttings from one well with those of another, thereby rendering structural determination by this method ineffective. Sometimes actual cores or chunk samples of the various formations penetrated by the drill are taken in order that the beds may be recognized and correlated. This procedure is slow and expensive, and frequently necessitates deep drilling in order to penetrate recognizable marker beds which may be correlated from hole to hole.

It is a well known fact that rock material varies greatly in its composition. Some are porous; others are dense; still other rock material is highly elastic. Some rock material is soft. Other rock material is extremely hard. Different rock materials possess different capabilities of transmitting energy. Limestone, for example, will transmit energy at a higher frequency than shale. If an energy transmitting means such as an oscillator or vibrator were placed closely adjacent to a material which transmitted energy readily, it would be under a different load than if it were adjacent rock strata which transmitted energy with difficulty. If the source of energy vibrated at a frequency which was in resonance with the natural frequency of vibration of the rock material, peaks would occur.

One object of our invention is to provide a novel method of logging bore holes.

Another object of our invention is to log bore holes by investigating the energy transmission characteristics of varied rock structure.

Other and further objects of our invention will appear from the following description.

In the accompanying drawings which form part of the instant specification and are to be read in conjunction therewith and in which like reference numerals are used to indicate like parts in the various views;

Fig. 7 is a view of record strips taken by the method of our invention.

Fig. 9 is a diagrammatic view of an amplifier for use with the embodiment shown in Fig. 8.

Figure 1:
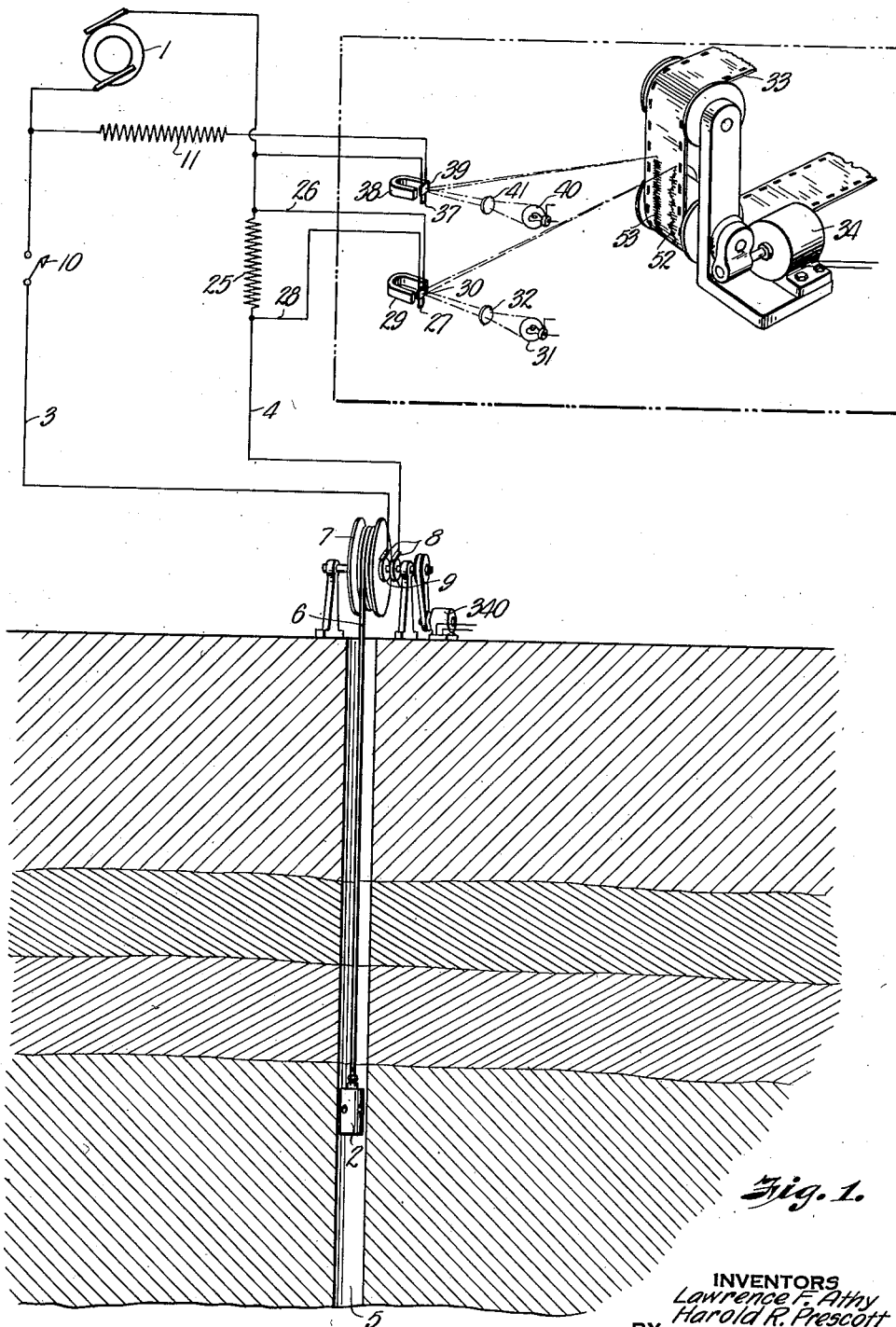
Fig. 1 is a diagrammatic view of a geological section showing a bore hole fitted with apparatus capable of carrying out the method of our invention.

Referring now to the drawings, and more particularly to Fig. 1, an alternator 1 delivers alternating potential to transmitter 2 through conductors 3 and 4. The transmitter is a source of energy and is lowered into the drill hole 5 by means of an electric cable 6, normally housed upon a reel 7, the electric energy being transmitted through brushes 8 and slip rings 9. The circuit is adapted to be closed by a key 10 if transient effects are desired, as will be pointed out more fully hereinafter.

A resistance 25 is in series with one conductor 4. Oscillograph element 27 is connected across the resistance 25 by means of conductors 26 and 28. It will be readily apparent that the leads 26 and 28 placing the oscillograph element 27 across the resistance 25 will furnish an index of current flowing from the current source 1. The oscillograph element will measure the voltage across the resistance. Since the resistance is fixed, the voltage across the resistance will vary as a function of the current. The oscillograph element 27 is supported within the field of magnet 29, and carries a mirror 30 upon which light from incandescent lamp 31 is projected by a lens 32 for reflection by the mirror upon a sensitized strip 33 adapted to be moved past the light spot by any suitable means such as an electric motor 34, thus forming a trace 52 upon the sensitized strip. This trace will serve as an indication of the current in the conductor 4, and, therefore, the current in the transmitter coil.

A resistance 11 is connected across conductors 3 and 4. Oscillograph element 37 is in series with the resistance 11 and will accurately serve as a voltmeter means for indicating the voltage across the conductors 3 and 4. The oscillograph element 37 is positioned within the field of permanent magnet 38 and carries a mirror 39 upon which light from incandescent lamp 40 is focused by means of lens 41 for reflection by the mirror upon the sensitized strip 33. The light reflected by mirror 39 will form a trace 53 upon the record strip, which trace will serve as an indication of the voltage across the conductors 3 and 4. A motor 340 may drive the reel 7 through any suitable transmission for lowering and raising the transmitter 2.

Figure 2:
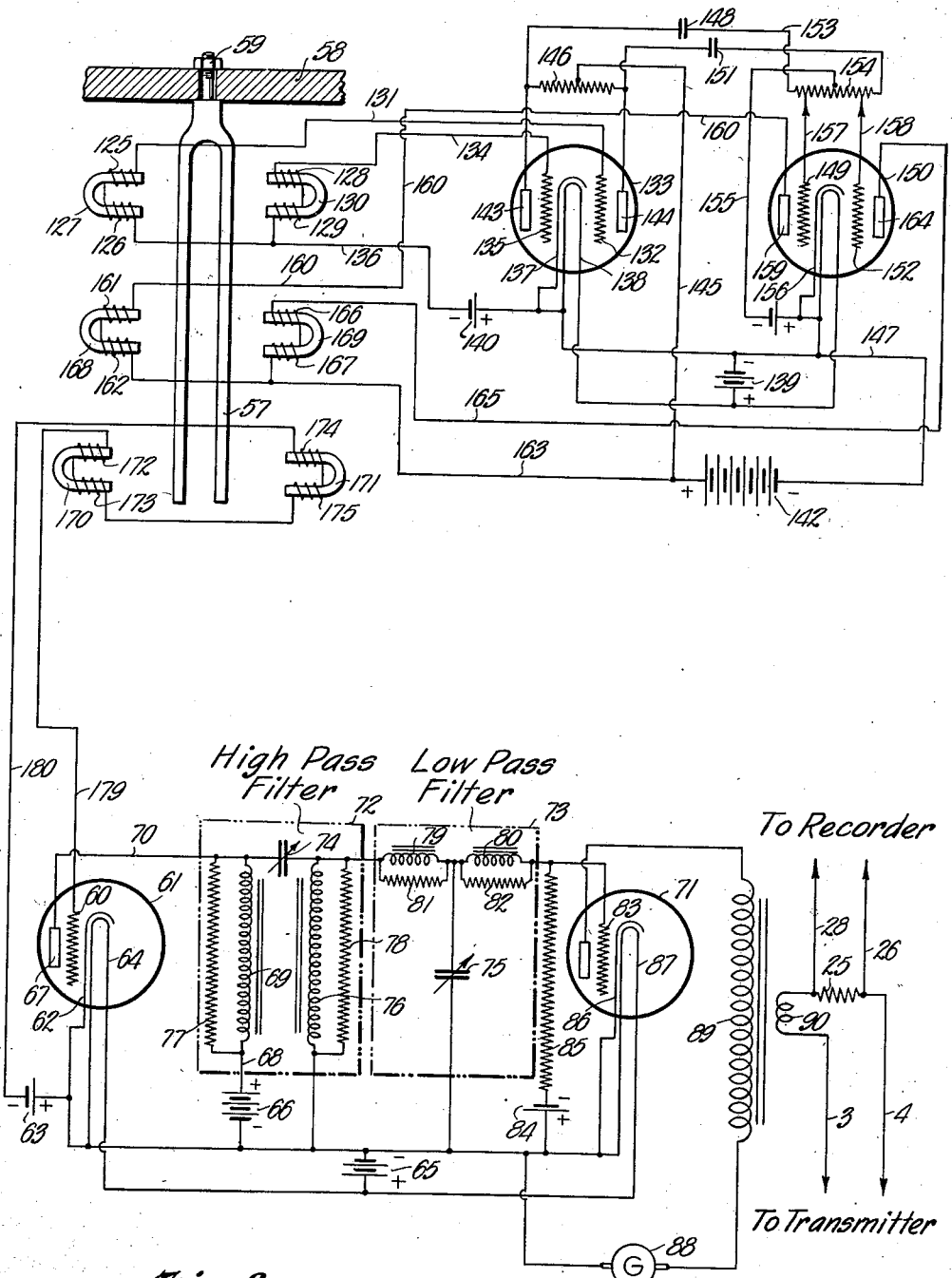
Fig. 2 is a schematic view of an alternator capable of producing alternating current of a fixed predetermined frequency adapted to energize a transmitter for producing energy capable of use in our invention.
Figure 3:
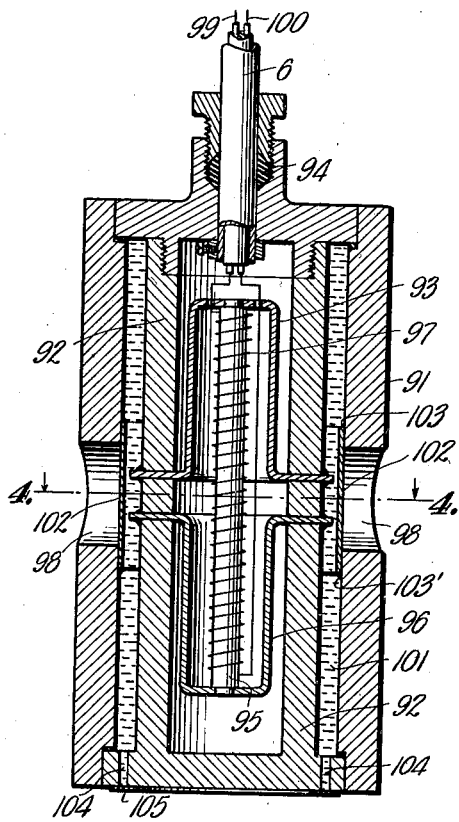
Fig. 3 is a sectional view of a transmitter or receptor of use in carrying out our invention.
Figure 5:
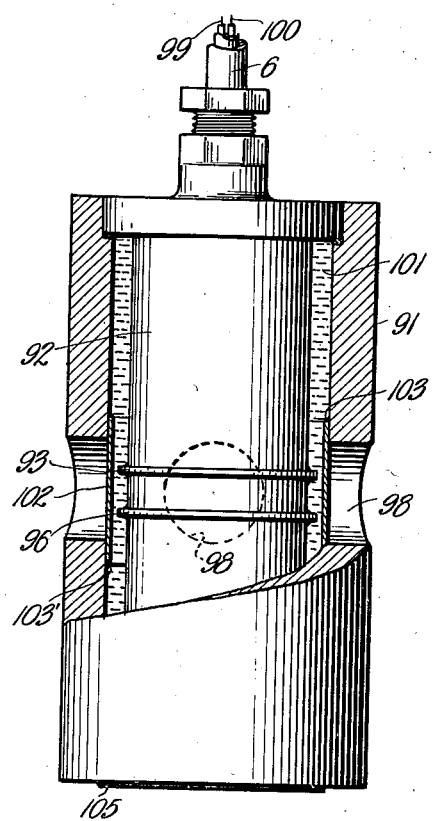
Fig. 5 is another view of a transmitter or receptor shown in Fig. 3, with part of the casing broken away.
Figure 4:
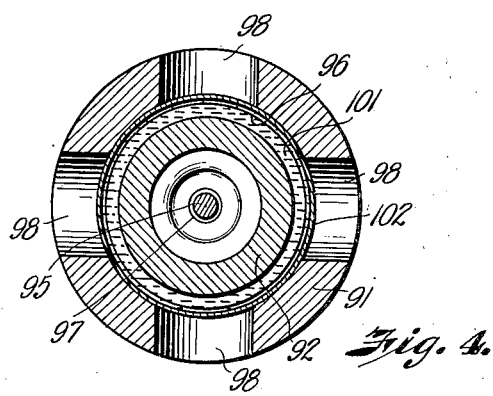
Fig. 4 is a sectional view taken on the line 4—4, Fig. 3.
Figure 6:
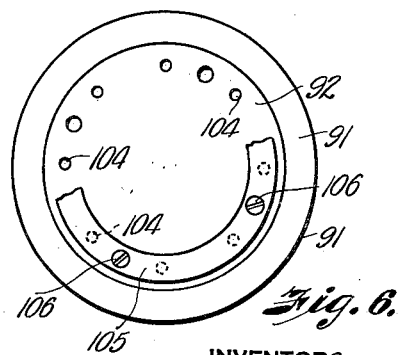
Fig. 6 is a bottom plan view with parts broken away, of the transmitter or receptor shown in Fig. 3.

The alternator 1, adapted to furnish energy to the transmitter 2, is shown diagrammatically in Fig. 2. It is to be understood, of course, that while the source of energy is shown to be a transmitter actuated by an alternator, the showing is by way of illustration only, and not by way of limitation, as any suitable means for creating energy may be used in carrying out our invention. We prefer to provide a source which will be responsive to alternating current of a desired frequency. Such a source is shown schematically in Fig. 2, in which a vibrating member such as a tuning fork 7 is suspended from any suitable support 58. The natural frequency will be determined by the length and shape of the vibrating member. It is contemplated that, when it is desired to obtain different frequencies, different tuning forks having different natural frequencies may be readily substituted by removing nut 59 and remounting a new tuning fork or vibrating member. Coils 125 and 126 are wound around a small permanent magnet 127. Coils 128 and 129 are wound around a small permanent magnet 130. The coils 125, 126, 128 and 129 are exciting coils which develop a voltage as the vibrating member 57 oscillates. This voltage is induced in the windings when the external field of the magnet is altered by the member 57 alternately coming closer and then farther away from the coils, altering the external field of the small magnets 127 and 130. The voltage induced in the exciting coils 125 and 126 is led by conductor 131 to one grid 132 of a thermionic tube 133. The voltage induced in coils 128 and 129 is impressed by conductor 134 upon the grid 135 of the thermionic tube 133, the return portion of the circuits being comprised by conductor 136 which is connected to the cathode 137 of the tube 133. The cathode 137 is heated by a filament heater 138 to which current is supplied from a battery 139. A battery 140 furnishes bias voltage for the grid. A battery 142 supplies positive potential to the plates 143 and 144 of the tube 133, through a conductor 145 and center tapped resistance 146, the return in the plate circuit being from the negative terminal of the battery 142 through conductor 147 to cathode 137. Plate 143 is coupled by condenser 148 to the grid 149 of thermionic tube 150. Plate 144 is coupled by condenser 151 to the grid 152 of the tube 150. The other side of condenser 148 is connected by conductor 153 to one end of a resistance 154. The other side of condenser 151 is connected to the opposite end of the resistance 154. The resistance 154 is center tapped by a conductor 155 connected to cathode 156 of tube 150. Conductor 157 adjustably connects grid 149 to the resistance 154, while conductor 158 adjustably connects grid 152 to the resistance 154. The adjustment of conductors 157 and 158 controls the output of tube 150 acting as a volume control. The plate 159 of the tube 150 is connected to the positive terminal of battery 142 through conductor 160, windings 161 and 162, and conductor 163. The plate 164 of the tube 150 is connected to the positive terminal of battery 142 by conductor 165, windings 166 and 167, and conductor 163. The windings 161 and 162 are about a soft iron electromagnet core 168. The windings 166 and 167 are about a soft iron electromagnet core 169. The windings 161, 162, 166 and 167 are driving windings. The output of tube 150 is controlled to supply sufficient energy to keep the member 57 in oscillation. The driving electromagnets 168 and 169 are positioned as far as possible on each side of oscillating member 57 and still maintain oscillation. This reduces damping caused by residual magnetism of the cores and allows member 57 to oscillate as freely as possible. The amplitude of motion of vibrating member 57 is quite low in order that the motion may be as free of harmonics as possible. Mounted on each side of oscillating member 57 are small permanent magnets 170 and 171. Windings 172 and 173 are disposed about the poles of magnet 170. Windings 174 and 175 are disposed about the poles of magnet 171. As the member 57 of magnetic material vibrates, driven by driving electromagnets, as described above, it will alternately approach and recede from each of the small permanent magnets 170 and 171, varying the external magnetic field and inducing voltages in the windings 172 and 173, and 174 and 175. The pickup windings 172, 173, 174 and 175 are well separated from the vibrating member 57, are balanced and adjusted to have as nearly as possible a linear relationship between changes in the external flux of the small magnets with changes in the position of the vibrating member 57. This will give induced electrical voltages substantially as free of harmonics as the motion of vibrating member 57. The voltages induced in the windings 172, 173, 174 and 175 are led by conductor 179 to the grid 60 of thermionic tube 61, the return circuit being completed by conductor 180 to cathode 62 of the tube 61. The grid is biased by a "C" battery 63. The cathode is provided with a filament heater 64 to which current is supplied from an "A" battery 65. Positive potential from a "B" battery 66 is supplied to the plate 67 of the tube 61 through conductor 68, choke coil reactance 69, through conductor 70, as can readily be seen by reference to Fig. 2. The thermionic tube 61 will amplify the induced voltages generated in the windings 172, 173, 174 and 175. The amplified voltage is passed to thermionic tube 71 for further amplification through a high pass filter 72 and a low pass filter 73. The condenser 74 of the high pass filter is set to reject frequencies lower than the fundamental of the vibrating member 57. The condenser 75 of the low pass filter is set to reject frequencies higher than the fundamental of the vibrating member 57. In parallel with the choke coil reactances 69 and 76 of the high pass filter are resistances 77 and 78. In parallel with the choke coil reactances 79 and 80 of the low pass filter are resistances 81 and 82. The resistances are of such value that the network is well damped in order that electrical oscillations will not be generated, enabling the natural frequencies of the vibrating member 57 to be reproduced faithfully in wave form. In this connection, it is unimportant whether or not phase changes occur.

Plate output of tube 61 is impressed through the filters upon the grid 83 of the thermionic tube 71, the grid being biased by a "C" battery 84 through a resistance 85. The cathode 86 of tube 71 is provided with a filament heater 87 which is supplied with current from the "A" battery 65. "B" power is supplied to the plate circuit of the thermionic tube 71 by a generator 88. The output of thermionic tube 71 is connected across the primary winding 89 of the transformer. The secondary winding 90 of the transformer is adapted to impress the alternating voltage upon the transmitter 2. The transformer, of which winding 89 is the primary, must be made with good iron and a high primary inductance in order to deliver energy at the frequency desired and in order to be as free of harmonics as possible.

In certain cases where it is not necessary to have a good wave form, the high pass filter and the low pass filter may be removed between tubes 61 and 71, and either a resistance coupling or transformer coupling may replace the filters. Frequencies sufficiently high may be normally used so that the output of the pickup coils 172, 173, 174 and 175 is fairly free of harmonic content if the design is carefully laid out.

It is to be understood that any suitable source of alternating current known to the art may be employed, such as for example a beat frequency oscillator in which case a power amplifier capable of properly exciting the transmitter will be employed.

Referring now to Figs. 3, 4, 5 and 6, the transmitter construction is shown, it being understood that the same construction may be employed as a receptor. The outer protecting case 91 houses an inner case 92, the inner base being sufficiently strong to withstand the bore hole pressures encountered. We prefer to make it out of non-magnetic material. It may be made out of any suitable material such as composition, stainless steel or of phenol condensation products. The outer case 91 is made out of any suitable metallic material and is provided with a plurality of openings 98 disposed at a plurality of places so as to render the oscillator non-directional horizontally. The cable 6 enters the inner case through a stuffing box 94. The core 95 may be permanently magnetized or may be made out of magnetic iron. Disposed around the core is a coil 97, the ends of which are electrically connected to conductors 99 and 100. Core extensions 93 and 96 terminate in flanges which extend through the walls of the inner case 92, being brazed or welded thereto. These core extensions may be of a material having high permeability such as nickel-steel, while the core proper 95 may be a permanent magnet. The flanges of the core form the core poles and project through the casing 92 into the annular space between casings 92 and 91. This annular space is filled with a fluid 101 to protect the diaphragm 102 from collapsing under the bore hole fluid pressure. The fluid 101 may be any suitable fluid such as oil. The fluid selected should be of such viscosity as to give suitable damping. The diaphragm 102 is welded peripherally at 103 and 103'. A plurality of openings 104 provide communication between the bore hole and the fluid 101 within the annular space between the casings 91 and 92. These openings are normally closed by diaphragm 105 which is adapted to permit the pressure to equalize between the fluid in the well and the fluid 101. If the equalizing diaphragm were not employed and the holes 104 were sealed, the power delivered to the magnetic circuit would exhibit itself only in harmonic distortion or rippling of the diaphragms. It will be noted that all parts except the diaphragms are constructed very rigidly so that, for the frequencies involved, they may be considered substantially rigid. The damping fluid is substantially incompressible. Accordingly, the vibratory waves in such case would result only from the harmonic distortion or rippling of the diaphragms and the vibratory waves in the bore hole fluid would be set up at low efficiency. With the equalizing diaphragm 105 the linear distance from the side diaphragm to the equalizing diaphragm is one fourth the wave length of the vibratory energy or more for the particular frequency employed. This provides that the inertia of the fluid involved in the return path will be sufficiently great for the frequency involved and a vibration wave motion will be set up which tends to deliver energy to the surrounding medium. If the distance from side diaphragms to equalizing diaphragms is a small fraction of the wave length for the energy involved, the inertia of the material involved in the return path from side diaphragm to equalizing diaphragm is small, comparatively speaking, and the path will nearly "short circuit" the energy delivered by the side diaphragm, causing a low efficiency. The diaphragm 105 is retained in place by any suitable means such as screws 106.

As electrical impulses are impressed upon conductors 99 and 100, the diaphragm 102 will move and energy is delivered horizontally through the fluid of the bore hole to the geological strata. The viscosity of the fluid 101 is such that the combined damping caused by the magnetic circuit, the fluid 101 and the normal bore hole fluid is adequate for the type of wave motion produced. Where transient impulses are employed and it is desired to control these transients, a more careful control of the damping of diaphragm 102 is necessary than when a steady state of wave motion is employed.

The structure just described may be employed as a receptor. Wave motion traveling through the geological layer causes a differential motion between the diaphragm and the case because of difference in inertia. This will produce a potential in the coil 97 in sympathy with the motion at the receptor, which potential is amplified and recorded as will be described more fully hereinafter.

It will be appreciated that the receptor is highly directional in that vertical motion along the supporting cable and through the bore hole fluid will be materially suppressed because of the unusual rigidity of the diaphragm in the vertical direction as compared to the horizontal direction. The plurality of openings used around the periphery of the case render the receptor sensitive to horizontal motions in any direction. If it should be desired to use vertical vibrations and to receive them at a receptor, the receptor must be lowered in a position ninety degrees from that shown in Fig. 5. Because of the use of a fixed frequency of vibration and the amplification and receiving system employed, vertical vibrations caused by the cable are rejected. This will be more fully described hereinafter.

The arrangement is such that the recording system will indicate a change of impedance of the transmitter as it is lowered into the bore hole. The apparatus may be used in a variety of manners to accomplish the object and method of our invention. For example, the current indicated by oscillograph element 27 may be held constant and the variation in voltage indicated by oscillograph element 37 will indicate changes of rock types.

This will be clear from a consideration of the following. Let us assume that the transmitter is lowered into a strata of very firm, hard material such as crystalline limestone. This material is so hard that the diaphragm will move only slightly. Then let us suppose that the transmitter is lowered into a strata of unconsolidated green shale. This material is soft enough to permit a greater amplitude of motion of the diaphragm. Bearing in mind that the diaphragm is of magnetic material, the reluctance of the magnetic circuit will alter as a function of the spacing of the diaphragm. In the case of limestone, the diaphragm, moving only slightly, the reluctance of the magnetic circuit is substantially the same as though the diaphragm were clamped in neutral position rigidly. In the case of the shale bed with a larger amplitude of diaphragm motion, during part of one vibration, the diaphragm will be quite close to the inner magnet. It will then recede to have a greater separation than corresponds to its neutral position. This change of spacing, particularly for that part of the motion which tends to move the diaphragm closer to the magnetic circuit, changes the momentary reluctance of the magnetic circuit more than is compensated for by the motion of the diaphragm from neutral out to its extreme point because of the changes in the air gap involved. This variation of magnetic reluctance causes a change in coil impedance which may be observed by holding the current constant and observing variations in voltages or vice versa.

As an illustration of the foregoing, suppose the gap from magnetic pole to diaphragm is .01 inch. When the transmitter is in a limestone stratum, its motion will be so small that the reluctance of the magnetic circuit is largely determined by the .01 inch gap.

If in the shale strata the diaphragm move .005 inch each side of neutral, the momentary reluctance will be one half when the diaphragm is close to the magnetic poles, and the momentary reluctance will be three halves of the neutral position when the diaphragm is at its extreme position. The net result of this vibration is obviously then a change in reluctance with diaphragm movement. If desired, the voltage indicated by oscillograph element 37 may be held constant and variations in the current indicated by oscillograph element 27 may be used to indicate variations in rock type. The frequency employed may be varied by substituting various tuning forks 57 of the desired frequency in the alternator, making such adjustments as are necessary in the filters. The frequency employed may vary between wide limits depending upon the rock types being investigated. A frequency is selected which reflects the greatest variation in impedance change in the transmitter.

Referring now to Fig. 7, there are shown two record strips on which appears curves plotted from information obtained by using a plurality of different frequencies. The voltage as indicated by oscillograph elements 37 was held constant and the frequency of the source system changed. The frequency was noted for the peak current as indicated by the maximum amplitude of the trace made by oscillograph element 27 showing the current. This information is plotted for various depths as the transmitter is lowered. At the same time, the frequency at which the minimum energy is delivered to the transmitter, and hence to geological strata, may be determined and placed upon a plot giving a record such as shown on record No. 2 of Fig. 7. It will be readily apparent that a comparison of a pair of such energy-frequency logs of one bore hole with another pair of logs from another bore hole will serve as a means of correlation of geological strata. A single energy frequency log from one bore hole may be compared with a single energy frequency log from another bore hole, and serve as a means of correlation. The logs may be correlated either by the comparison of maximum amplitudes or by comparison of minimum amplitudes depending upon the identifiable peaks obtained at the various frequencies.

It is to be noted that as the transmitter passes different geological strata the frequency varies at which maximum energy is delivered to the transmitter, and therefore to the geological strata. It is also to be noted that as the transmitter passes different strata the frequency varies at which minimum energy is delivered to the transmitter and hence to the geological strata. For example, limestone would transmit maximum power at a higher frequency than shale. It is important that the transmitter shown in Figs. 3, 4, 5 and 6 be well damped and free of troublesome self-oscillations when delivering energy. It is also important to know the overall energy delivering characteristics of the transmitter in order that corrections may be made for any undesirable parts, or that corrections may be made to the transmitter construction, thus obtaining a more suitable overall delivering characteristic. We have obtained this characteristic by plotting the energy curve in a large container filled with a fluid of known characteristics.

Our method may be carried out not only with steady state frequencies, but with transient impacts delivered at various frequencies and the same information plotted where the geological strata show that more significant relief is obtained on the final record strip or plot.

Figure 8:
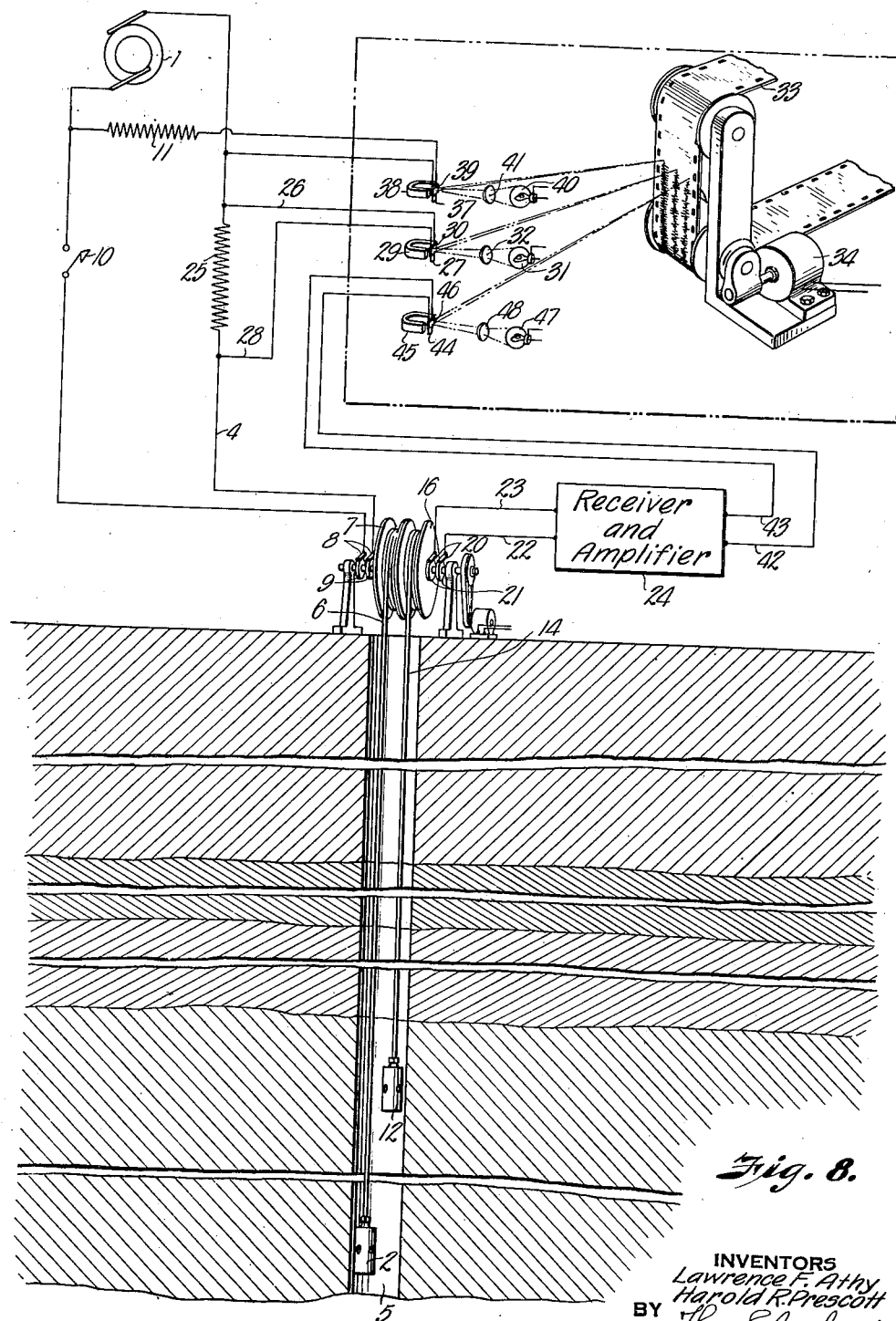
Fig. 8 is a diagrammatic view of a bore hole similar to that shown in Fig. 1, showing a modification of apparatus capable of use in carrying out the method of our invention.

Referring to Fig. 8 we have added a receptor 12 supported by an electric cable 14 wound around a suitable reel 16. The conductors of cable 14 are electrically connected to conductors 22 and 23 through suitable brushes 20 and collecting rings 21. The conductors 22 and 23 are connected to a receiver and amplifier 24 shown diagrammatically in Fig. 9. The output of the amplifier 24 is led by conductors 42 and 43 to an oscillograph element 44 positioned within the field of a permanent magnet 45. The oscillograph element 44 carries a mirror 46 upon which is focused by means of a lens 48, light from an incandescent lamp 47 for reflection upon the record strip 33, along with light reflected from the mirror 30 actuated by oscillograph element 27 and light from mirror 39 carried by oscillograph element 37. The oscillograph elements 27 and 37 are adapted to record current and voltage and are connected as shown in Fig. 1.

Referring now to Fig. 9, the output of conductors 22 and 23 is connected across the primary winding 107 of the input transformer. This winding has a low impedance to match the impedance of the receptor and minimize induced voltage in the conductors from the source system conductors. The secondary winding 108 of the input transformer, one end of which is connected by conductor 109 to the grid 110 of the thermionic tube 111 provides a step-up for the voltage received by the receptor. The cathode 112 of the tube 111 is provided with a filament heater 113, which is furnished energy by an "A" battery 114 through leads 115 and 116. The grid 110 is biased by a "C" battery 117. The plate 118 of thermionic tube 111 is connected by conductor 119 to impress the output of tube 111 through a high pass filter 120 and a low pass filter 121, the filtered energy passing through conductor 122 to the grid 123 of thermionic tube 124. The condenser 181 of the high pass filter 120 is adjusted to reject frequencies below those of the predetermined frequencies, while the condenser 182 of the low pass filter is adjusted to reject frequencies higher than those which it is desired to receive. The volume control comprising the resistance 183 and the variable arm 122 adjusts the overall gain. The grid 123 is biased by a "C" battery 184. Resistances 185 and 186 are connected across reactances 187 and 188 of the high pass filter, while reactances 191 and 192 are shunted by resistances 189 and 190. These resistances suitably damp the electrical network in order to prevent self-oscillation. This damping is desirable when transient impulses are received in order that the impulses will be amplified with reasonable faithfulness. Cathode 193 of the tube 124 is provided with a filament heater 194 which is supplied energy from the "A" battery 114. Plate voltage is supplied from "B" battery 195, the positive terminal thereof being connected to the plate 118 of tube 111 by conductor 196, reactance 187 and conductor 119. The positive pole of "B" battery 195 is connected to the plate 197 of the tube 124 through conductor 198, primary winding 199 of the output transformer and conductor 200. The secondary winding 218 of the output transformer is connected by leads 42 and 43 to the oscillograph element 44, as shown in Fig. 8.

In the arrangement shown in Fig. 8, a record strip or plot may be obtained by delivering energy to the transmitter and varying the amount of energy until the receptor receives a predetermined constant amount as indicated by the trace of oscillograph element 44. Another record strip or plot may be obtained by delivering constant power to the transmitter, that is, the product of current and voltage as indicated by the two traces of oscillograph elements 27 and 37 be maintained a constant and variations in the amplitude of the trace of the oscillograph element 44 be plotted to give curves for correlation.

Still another method of forming plots is to determine the steady state frequency at which maximum energy will be delivered from the transmitter to the receptor using constant power, it being understood, of course, that the filter on the amplifier will be adjusted along with the change in the frequency of the source system in obtaining this plot. A further plot may be obtained by determining the steady state frequency at which minimum energy will be delivered from transmitter to receptor using constant power into the transmitter, adjusting the filter on the amplifier in accordance with the changes in the frequency.

Figure 10:
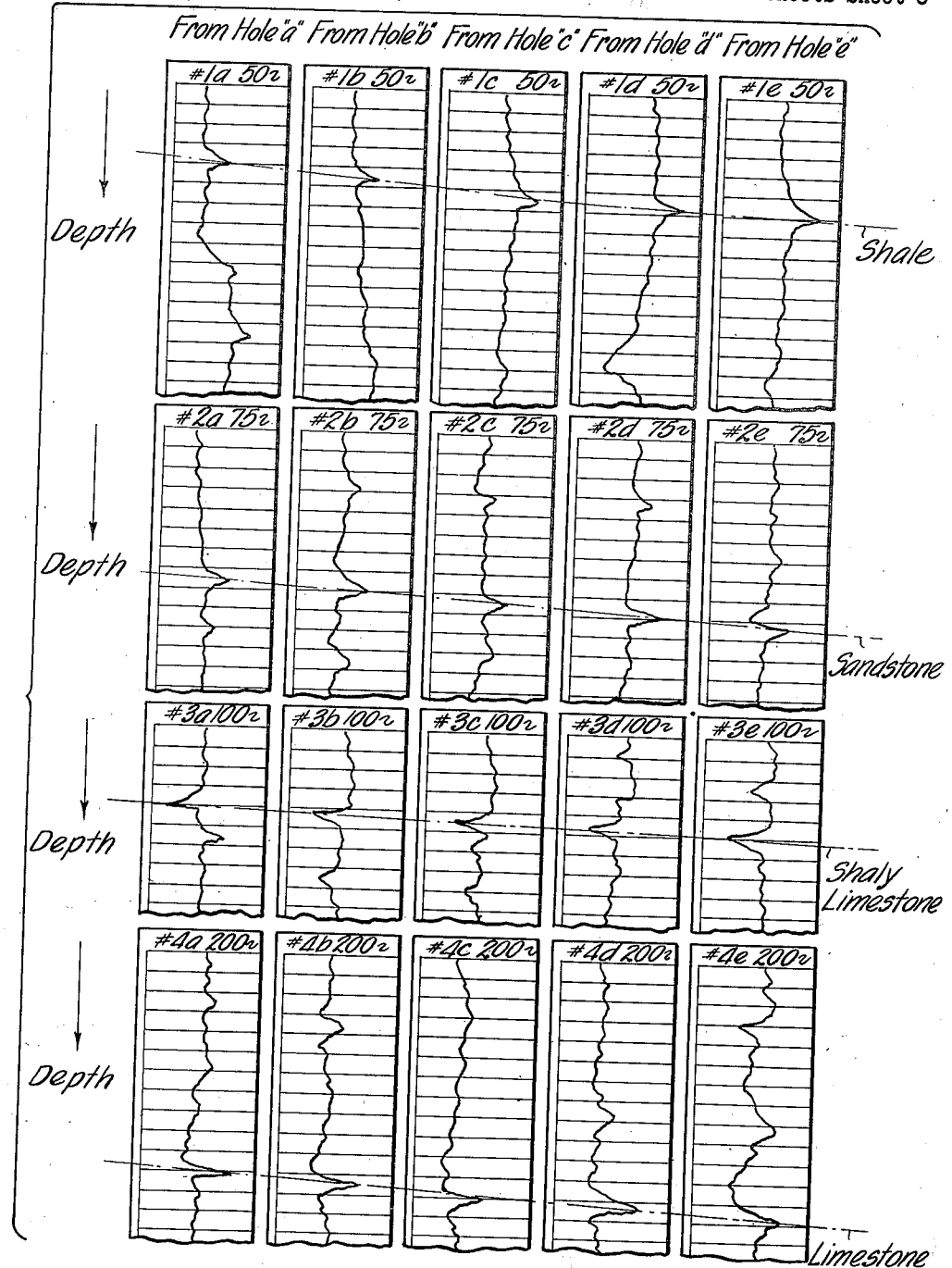
Fig. 10 is a view of plots from a plurality of bore holes using a steady state alternating current at the transmitter and employing various frequencies, made in accordance with the method of our invention.

Referring now to Fig. 10, there is shown a set of plots from a plurality of bore holes, four in number. The records from the respective bore holes were made with a steady state alternating current at the transmitter. The number 1 records were made using a frequency of 50 cycles, the number 2 records were made using a frequency of 75 cycles. The number 3 records were made using a frequency of 100 cycles, and the number 4 records were made using a frequency of 200 cycles. The power delivered to the transmitter was held constant and variations in amplitude received at the receptor, as indicated by the trace of oscillograph element 44 in Fig. 8, were plotted for various depths. A comparison of curves 1a, 2a, 3a and 4a shows the results obtained at the different frequencies. It will be observed by reference to Fig. 10 that a peak response was obtained with a frequency of 50 cycles in a shale layer, which may be traced from bore hole to bore hole by the presence of the peak on the 50 cycle curves. A peak was obtained at another depth using a frequency of 75 cycles from a sandstone stratum, which obviously could be traced from bore hole to bore hole as shown by the construction line. At 100 cycles a peak was obtained in a shaley limestone layer at still another depth, the peak being readily traceable from hole to hole, indicating the course of the particular layer causing the response. At 200 cycles a peak at a deeper lying limestone layer was characteristic and easily correlated.

It is understood, of course, that the same result is achieved if the amplitude of the receptor is held at a constant and power variation required to maintain the constant amplitude plotted as the cable system is lowered into the bore hole. It will be noted that the layer which caused the peak at 50 cycles is discernible at 75 cycles, though not as readily, and that the use of the new frequency brought to light another layer readily apparent in Fig. 10.

We have found that beds which have rather abrupt or distinguishable changes in transmission ability are readily indicated by means of logs obtained by our method. The beds which exhibit good transmitting ability for the low frequency elastic waves are beds with low elasticity such as shales. The beds which exhibit good transmitting ability for the high frequency elastic waves are beds with high elasticity such as limestone.

Figure 11:
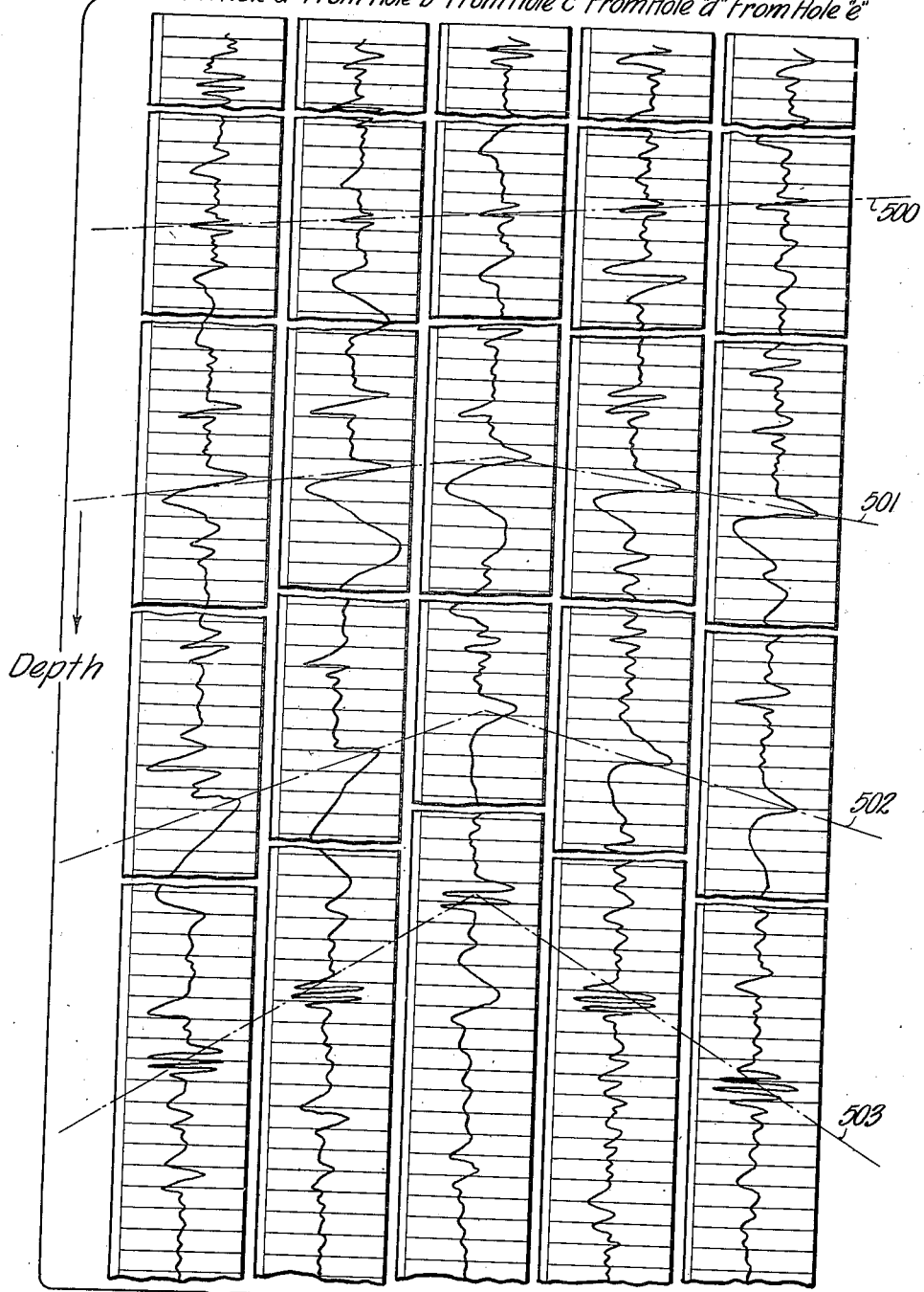
Fig. 11 is a view of plats from a plurality of bore holes using transient motions at the transmitter, made in accordance with the method of our invention, showing correlation of the record strips.

Referring now to Fig. 11, a set of logs where transient motions were employed are shown. The logs were made by closing key 10 of Fig. 8 for an instant and running the motor 34 at an increased speed to move the record strip to increase the time axis. For purpose of comparison of curves from different holes, the transient impulse impressed on the transmitter should be held similar. Fig. 11 shows sections of record strips taken from a plurality of bore holes at close intervals up and down the bore hole. It will be clear that the frequency, amplitude, wave form and damping of the motion which arrives at the receptor is influenced largely by the medium through which the impact traveled in reaching the receptor and that variations in the characteristics of the transient motion received are a valuable index of variation in geological strata.

It will be noted that a series of high frequency motions are correlated by the construction line 500 in Fig. 11. They are of medium amplitude with medium damping and represent a sandstone bed quite compact and well cemented.

It will be noted that the construction line 501 on Fig. 11 correlates a low frequency motion of medium damping and high amplitude received from a shale bed. Construction line 502 correlates a low frequency motion of high damping and high amplitude, while construction line 503 correlates an easily distinguished high frequency wave train of medium amplitude and low damping received from a hard compact limestone.

It will be apparent to those skilled in the art that we have accomplished the objects of our invention. We have provided a method of logging bore holes through the energy and frequency transmission characteristics of various geological strata. We are enabled to accurately plot the geological sections in which a plurality of bore holes have been drilled without the necessity of sampling drill cuttings to determine variation in their mineral content, thus avoiding the slow, expensive and frequently inaccurate methods.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of logging bore holes including the steps of generating an alternating potential, impressing said alternating potential upon a vibratory means, lowering said vibratory means into a bore hole, the log of which is being made in predetermined fixed relation to means responsive to vibratory energy, receiving vibratory energy at said energy-responsive means, varying the frequency of said alternating potential, noting the extreme of variation of energy received at said receiving means, and plotting extremes of energy received at said receiving means against depth, to obtain the desired bore hole log.

2. A method as in claim 1 in which said extreme of variation of energy is the minimum energy.

3. A method as in claim 1 in which the extreme of variation of energy is the maximum energy.

LAWRENCE F. ATHY.
HAROLD R. PRESCOTT.